United States Patent
Ikeda et al.

(10) Patent No.: US 9,748,590 B2
(45) Date of Patent: Aug. 29, 2017

(54) FUEL CELL SYSTEM

(75) Inventors: Kotaro Ikeda, Susono (JP); Masaaki Matsusue, Mishima (JP); Yumi Inoue, Numazu (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 156 days.

(21) Appl. No.: 14/397,912

(22) PCT Filed: May 1, 2012

(86) PCT No.: PCT/JP2012/061528
§ 371 (c)(1),
(2), (4) Date: Oct. 30, 2014

(87) PCT Pub. No.: WO2013/164873
PCT Pub. Date: Nov. 7, 2013

(65) Prior Publication Data
US 2015/0086890 A1    Mar. 26, 2015

(51) Int. Cl.
*H01M 8/04858*  (2016.01)
*H01M 8/04664*  (2016.01)
*H01M 8/04223*  (2016.01)
*H01M 8/1018*   (2016.01)

(52) U.S. Cl.
CPC ..... *H01M 8/04873* (2013.01); *H01M 8/0488* (2013.01); *H01M 8/04671* (2013.01); *H01M 8/04223* (2013.01); *H01M 8/04238* (2013.01); *H01M 8/04865* (2013.01); *H01M 2008/1095* (2013.01)

(58) Field of Classification Search
CPC ......... H01M 8/04865; H01M 8/04873; H01M 8/04238
See application file for complete search history.

(56) References Cited

U.S. PATENT DOCUMENTS

| | | | |
|---|---|---|---|
| 2003/0211372 A1* | 11/2003 | Adams | H01M 8/04238 320/101 |
| 2005/0136293 A1* | 6/2005 | Baker | H01M 8/04223 320/134 |

FOREIGN PATENT DOCUMENTS

| | | |
|---|---|---|
| CN | 100346519 C | 10/2007 |
| JP | 2005-527943 A | 9/2005 |
| JP | 2007-287674 A | 11/2007 |
| JP | 2010-027298 A | 2/2010 |

(Continued)

*Primary Examiner* — Jeremiah Smith
(74) *Attorney, Agent, or Firm* — Andrews Kurth Kenyon LLP (57) ABSTRACT

A fuel cell system according to the present invention comprises a control apparatus which performs performance restoration processing for a catalyst layer by decreasing the output voltage of a fuel cell to a predetermined voltage. When an oxide film formed on the catalyst layer during power generation of the fuel cell contains, in addition to a first oxide film that can be removed by decreasing the output voltage of the fuel cell to a first oxide film removal voltage, a second oxide film that can be removed by decreasing the output voltage of the fuel cell to a second oxide film removal voltage which is lower than the first oxide film removal voltage, the control apparatus estimates the amount of the second oxide film and performs performance restoration processing with a set voltage being equal to or lower than the second oxide film removal voltage only when it determines that the estimated amount exceeds a predetermined amount A.

4 Claims, 10 Drawing Sheets

(56) References Cited

FOREIGN PATENT DOCUMENTS

| | | | | |
|---|---|---|---|---|
| JP | 2010-040285 A | 2/2010 | | |
| JP | 2010027298 | * | 2/2010 | .............. H01M 8/04 |

* cited by examiner

FUEL CELL SYSTEM

CROSS-REFERENCE TO RELATED APPLICATIONS

This is a national phase application based on the PCT International Patent Application No. PCT/JP2012/061528 filed May 1, 2012, the entire contents of which are incorporated herein by reference.

TECHNICAL FIELD

The present invention relates to a fuel cell system having a catalyst activating function.

BACKGROUND ART

A fuel cell stack is a power generation system which oxidizes a fuel through an electrochemical process to thereby directly convert energy released as a result of the oxidation reaction into electric energy. The fuel cell stack has a membrane-electrode assembly in which a polymer electrolyte membrane, which selectively transports hydrogen ions, is sandwiched by a pair of electrodes made of porous materials. Each of the pair of electrodes includes: a catalyst layer that contains, as a main ingredient, carbon powder supporting a platinum-based metal catalyst, and that contacts with the polymer electrolyte membrane; and a gas diffusion layer formed on a surface of the catalyst layer, the gas diffusion layer having both air permeability and electronic conductivity.

In fuel cell systems of this type, if an operation of the fuel cell continues within an operation zone where a cell voltage is an oxidation voltage (about 0.7-1.0 V), a platinum catalyst effective area may be reduced due to the formation of an oxide film on a platinum catalyst surface of a catalyst layer, resulting in a degradation of the performance of the catalyst layer and thus a degradation of the power generation performance. Under such circumstances, Patent Document 1 describes processing for restoring power generation performance by, upon detection of the state in which a fuel cell continues to operate within an oxidation zone where the platinum catalyst is oxidized, decreasing a cathode potential to a reduction voltage (e.g., 0.6 V or lower) and thereby removing the oxide film from the platinum catalyst surface (hereinafter referred to as "refresh processing").

RELATED ART DOCUMENTS

Patent Documents

Patent Document 1: JP2010-040285 A

DISCLOSURE OF THE INVENTION

Problem to be Solved by the Invention

Recent studies about the formation and removal of an oxide film with respect to a catalyst layer have led to the finding that there may be two or more stages of reduction voltage that are capable of removing such oxide film. For example, if there are two stages of reduction voltage, the oxide film may contain, in a mixed state, a film (hereinafter referred to as a type-I oxide film) that can be removed by decreasing an output voltage of the fuel cell stack to the reduction voltage mentioned in Patent Document 1 (hereinafter referred to as a "first reduction voltage") and a film (hereinafter referred to as a type-II oxide film) that can be removed by decreasing the output voltage to a second reduction voltage which is lower than the first reduction voltage.

The refresh processing in Patent Document 1 only assumes one stage of reduction voltage (first reduction voltage) that is capable of removing the oxide film. Thus, if the output voltage of the fuel cell stack is decreased to the assumed first reduction voltage for a certain period of time, only the type-I oxide film can be removed but the type-II oxide film cannot be removed. Accordingly, the power generation performance may not be able to be sufficiently restored.

In addition, the refresh processing in Patent Document 1 has another problem in which the type-II oxide film that can be removed only by decreasing the output voltage to the second reduction voltage may be gradually accumulated, and the power generation characteristics will thereby be degraded in the long term. In particular, the inventors of the present invention have found that the type-II oxide film has a greater effect on the degradation of the performance of the catalyst layer, as compared to the type-I oxide film, and the inventors thus believe that the presence or absence of the type-II oxide film after such refresh processing is quite important.

On the other hand, although the refresh processing inevitably has to be performed in order to restore the performance of the catalyst layer, the refresh processing will also lead to a degradation of the catalyst layer (more specifically, the dissolution of platinum) due to the repetitive oxidation and reduction of platinum, which will lead to a degradation of the power generation performance. Thus, it is preferable to minimize the frequency of performing the refresh processing.

Therefore, an object of the present invention is to propose a fuel cell system which is capable of balancing the effect of performance restoration processing for a catalyst layer and a decrease in the frequency of such restoration processing.

Means for Solving the Problem

In order to achieve the object set forth above, a fuel cell system according to the present invention comprises: a fuel cell including a membrane-electrode assembly in which electrodes, each having a catalyst layer, are arranged on both surfaces of a polymer electrolyte membrane; and a control apparatus which performs performance restoration processing for the catalyst layer by decreasing an output voltage of the fuel cell to a predetermined voltage, wherein, when an oxide film formed on the catalyst layer during power generation of the fuel cell contains, in addition to a first oxide film that can be removed by decreasing the output voltage of the fuel cell to a first oxide film removal voltage, a second oxide film that can be removed by decreasing the output voltage of the fuel cell to a second oxide film removal voltage which is lower than the first oxide film removal voltage, the control apparatus estimates at least one of: the amount of the second oxide film; the total amount of the first and second oxide films; the amount of performance degradation of the catalyst layer caused by the second oxide film; and the total amount of performance degradation of the catalyst layer caused by the first and second oxide films, and performs the performance restoration processing only when the estimated amount satisfies a predetermined condition, and wherein the control apparatus performs the performance restoration processing by setting the predetermined voltage so as to be equal to or lower than the second oxide film removal voltage.

In the above configuration, if the control apparatus determines that the amount of the second oxide film exceeds a predetermined amount A, the control apparatus may perform the performance restoration processing in which the predetermined voltage is set so as to be equal to or lower than the second oxide film removal voltage With such configuration, the performance restoration processing is prevented from being performed until the amount of the second oxide film, that has a greater influence on a degradation of the performance of the catalyst layer, exceeds the predetermined amount A. In other words, such configuration avoids control in which the performance restoration processing is performed frequently every time a predetermined amount of the first oxide film is formed. Accordingly, with the above configuration, it becomes possible to solve contradictory aspects associated with the performance restoration processing and to restore the performance of the catalyst layer while suppressing the degradation of the catalyst layer.

In the above configuration, if the control apparatus determines that the amount of the second oxide film is equal to or smaller than a predetermined amount A and that the total amount of the first oxide film and the second oxide film exceeds a predetermined amount B, the control apparatus may perform the performance restoration processing in which the predetermined voltage is set so as to be equal to or lower than the second oxide film removal voltage.

With such configuration, by using the predetermined amount B, in which both the first oxide film and the second oxide film are taken into account, it is possible to further enhance the accuracy of judgment as to the need for performance restoration processing, as compared to the case in which only the predetermined amount A is used.

In the above configuration, if the control apparatus determines that the amount of performance degradation of the catalyst layer caused by the second oxide film exceeds a predetermined amount C, the control apparatus performs the performance restoration processing in which the predetermined voltage is set so as to be equal to or lower than the second oxide film removal voltage.

With such configuration, by directly estimating the amount of performance degradation caused by the second oxide film that has a greater influence on the performance degradation of the catalyst layer, it is possible to enhance the accuracy of judgment as to the need for the performance restoration processing, as compared to the case in which the amount of the oxide film is estimated.

In the above configuration, if the control apparatus determines that the amount of performance degradation caused by the second oxide film is equal to or smaller than a predetermined amount C and that the total amount of performance degradation of the catalyst layer caused by the first oxide film and performance degradation of the catalyst layer caused by the second oxide film exceeds a predetermined amount D, the control apparatus may perform the performance restoration processing in which the predetermined voltage is set so as to be equal to or lower than the second oxide film removal voltage.

With such configuration, by using the predetermined amount D, in which both the first oxide film and the second oxide film are taken into account, it is possible to further enhance the accuracy of judgment as to the need for the performance restoration processing, as compared to the case in which only the predetermined amount C is used.

A fuel cell system according to the present invention comprises: a fuel cell including a membrane-electrode assembly in which electrodes, each having a catalyst layer, are arranged on both surfaces of a polymer electrolyte membrane; and a control apparatus which performs performance restoration processing for the catalyst layer by decreasing an output voltage of the fuel cell to a predetermined voltage, wherein, when an oxide film formed on the catalyst layer during power generation of the fuel cell contains, in addition to a first oxide film that can be removed by decreasing the output voltage of the fuel cell to a first oxide film removal voltage, a second oxide film that can be removed by decreasing the output voltage of the fuel cell to a second oxide film removal voltage which is lower than the first oxide film removal voltage, the control apparatus performs the performance restoration processing in which the predetermined voltage is set so as to be equal to or lower than the second oxide film removal voltage when an estimated amount of the second oxide film or an estimated amount of performance degradation of the catalyst layer caused by the second oxide film satisfies a predetermined condition that is based on a predetermined threshold value, while the control apparatus does not perform the performance restoration processing, even when an estimated amount of the first oxide film or an estimated amount of performance degradation of the catalyst layer caused by the first oxide film satisfies the predetermined condition that is based on the predetermined threshold value.

Effect of the Invention

According to the present invention, it is possible to provide a fuel cell system which is capable of balancing the effect of performance restoration processing for a catalyst layer and a decrease in the frequency of such restoration processing.

DESCRIPTION OF REFERENCE NUMERALS

11: fuel cell system, 12: fuel cell, 24a: catalyst layer, 25: membrane-electrode assembly, 60: controller (control apparatus)

BEST MODE FOR CARRYING OUT THE INVENTION

Figure 1:
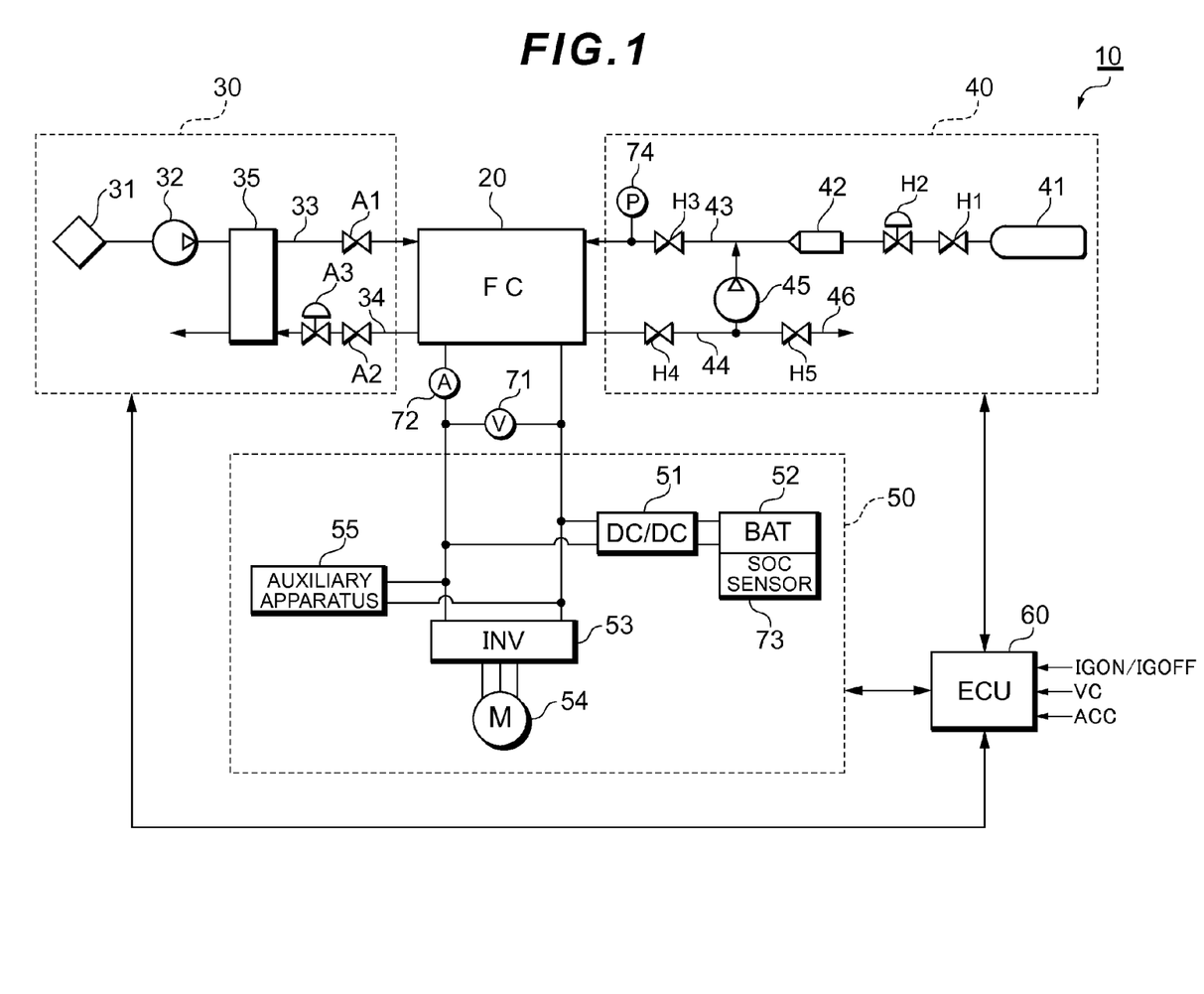
FIG. 1 is a configuration diagram showing a fuel cell system according to an embodiment of the present invention.

Embodiments of the present invention will be described below with reference to the attached drawings. FIG. 1 shows a system configuration of a fuel cell system 10 according to an embodiment of the present invention.

The fuel cell system 10 serves as an in-vehicle power source system that is installed in a fuel cell vehicle and includes: a fuel cell stack 20 which receives supply of reactant gases (a fuel gas and an oxidant gas) and generates electric power; an oxidant gas supply system 30 for supplying the air serving as the oxidant gas to the fuel cell stack 20; a fuel gas supply system 40 for supplying a hydrogen gas serving as the fuel gas to the fuel cell stack 20; a power system 50 for controlling charge and discharge of electric power; and a controller 60 which controls the system as a whole.

The fuel cell stack 20 is a solid polymer electrolyte-type cell stack in which a plurality of cells are stacked in series. In the fuel cell stack 20, the oxidation reaction in formula (1) occurs in an anode and the reduction reaction in formula (2) occurs in a cathode. The electrogenic reaction in formula (3) occurs in the fuel cell stack 20 as a whole.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Figure 2:
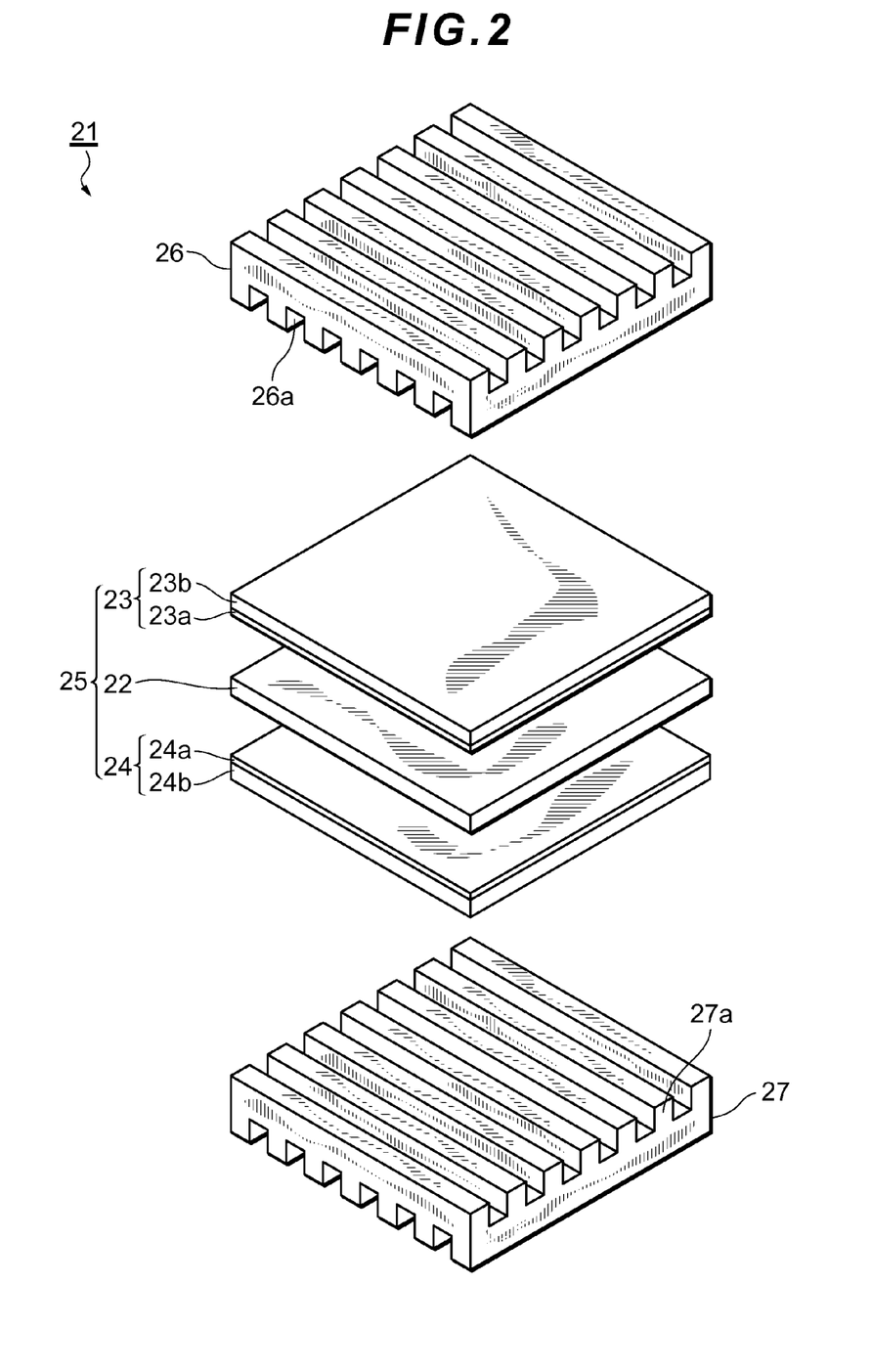
FIG. 2 is an exploded perspective view showing a cell constituting a fuel cell stack.

FIG. 2 is an exploded perspective view showing a cell 21 constituting the fuel cell stack 20. The cell 21 includes a polymer electrolyte membrane 22, an anode 23, a cathode 24 and separators 26 and 27. The anode 23 and the cathode 24 are diffusion electrodes having a sandwich structure in which such electrodes sandwich the polymer electrolyte membrane 22 from both sides thereof.

The separators 26 and 27 are made of a gas impermeable conductive member and they further sandwich the above sandwich structure from both sides thereof and form a fuel gas flow path and an oxidant gas flow path between the separators and the anode 23 and cathode 24, respectively. The separator 26 is provided with ribs 26a having a recessed shape in cross section.

By allowing the ribs 26a to abut onto the anode 23, the openings of the ribs 26a are closed so as to form the fuel gas flow path. The separator 27 is provided with ribs 27a having a recessed shape in cross section. By allowing the ribs 27a to abut onto the cathode 24, the openings of the ribs 27a are closed so as to form the oxidant gas flow path.

The anode 23 includes: a catalyst layer 23a which contains, as a main ingredient, carbon powder that supports a platinum-based metal catalyst (Pt, Pt—Fe, Pt—Cr, Pt—Ni, Pt—Ru, etc.) and contacts with the polymer electrolyte membrane 22; and a gas diffusion layer 23b formed on a surface of the catalyst layer 23a and having both permeability and electronic conductivity. The cathode 24 also includes a catalyst layer 24a and a gas diffusion layer 24b in the same way.

More specifically, the catalyst layers 23a and 24a are formed by dispersing the carbon powder, which is supporting platinum or an alloy consisting of platinum and other metal(s), into a suitable organic solvent, adding thereto an appropriate quantity of an electrolyte solution to turn it into a paste, and screen-printing the paste onto the polymer electrolyte membrane 22. The gas diffusion layers 23b and 24b may be formed of carbon cloth, carbon paper or carbon felt which is woven by carbon fiber yarn.

The polymer electrolyte membrane 22 is a proton-conducting ion-exchange membrane made of a solid polymer material (e.g., fluorinated resin) and such polymer electrolyte membrane 22 exhibits a preferable electrical conductivity in wet conditions. The polymer electrolyte membrane 22, the anode 23, and the cathode 24 form a membrane-electrode assembly 25.

Referring back to FIG. 1, the fuel cell stack 20 is provided with: a voltage sensor 71 for detecting an output voltage of the fuel cell stack 20 (FC voltage); and a current sensor 72 for detecting an output current of the fuel cell stack 20 (FC current).

The oxidant gas supply system 30 includes: an oxidant gas path 33 in which the oxidant gas to be supplied to the cathode in the fuel cell stack 20 flows; and an oxidant off-gas path 34 in which an oxidant off-gas discharged from the fuel cell stack 20 flows. The oxidant gas path 33 is provided with: an air compressor 32 which introduces the oxidant gas from the atmosphere via a filter 31; a humidifier 35 which humidifies the oxidant gas compressed by the air compressor 32; and a cutoff valve A1 for cutting off the supply of the oxidant gas to the fuel cell stack 20.

The oxidant off-gas path 34 is provided with: a cutoff valve A2 for cutting off the discharge of the oxidant off-gas from the fuel cell stack 20; a backpressure regulating valve A3 for regulating the supply pressure of the oxidant gas; and a humidifier 35 for exchanging moisture between the oxidant gas (dry gas) and the oxidant off-gas (wet gas).

The fuel gas supply system 40 includes: a fuel gas supply source 41; a fuel gas path 43 in which the fuel gas to be supplied from the fuel gas supply source 41 to the anode in the fuel cell stack 20 flows; a circulation path 44 for returning the fuel off-gas discharged from the fuel cell stack 20 to the fuel gas path 43; a circulation pump 45 which pumps the fuel off-gas in the circulation path 44 to send it to the fuel gas path 43; and an exhaust/drain path 46 which branches from the circulation path 44.

The fuel gas supply source 41 is constituted from, for example, a high-pressure hydrogen tank, a hydrogen absorbing alloy or similar and stores a hydrogen gas at a high pressure (e.g., 35 MPa to 70 MPa). When opening a cutoff valve H1, the fuel gas flows from the fuel gas supply source 41 toward the fuel gas path 43. The pressure of the fuel gas is reduced to, for example, about 200 kPa by, for example, a regulator H2 and an injector 42, and then the fuel gas is supplied to the fuel cell stack 20.

The circulation path 44 is connected to a cutoff valve H4 for cutting off the discharge of the fuel off-gas from the fuel cell stack 20 and the exhaust/drain path 46 branching from the circulation path 44. The exhaust/drain path 46 is provided with an exhaust/drain valve H5. The exhaust/drain valve H5 is actuated by a command from the controller 60 so as to discharge water, as well as the fuel off-gas containing impurities within the circulation path 44, toward the outside.

The fuel off-gas discharged from the exhaust/drain valve H5 is mixed with the oxidant off-gas flowing through the oxidant off-gas path 34 and diluted by a diluter (not shown). The circulation pump 45 is driven by a motor so as to circulate the fuel off-gas within the circulation system and supply it to the fuel cell stack 20.

The power system 50 includes a DC/DC converter 51, a battery (electric power storage device) 52, a traction inverter 53, a traction motor 54 and auxiliary apparatuses 55. The DC/DC converter 51 has: a function of increasing a direct-current voltage supplied from the battery 52 and outputting the resulting voltage to the traction inverter 53; and a function of decreasing the voltage of direct-current power generated by the fuel cell stack 20 or the voltage of regenerative power collected by the traction motor 54 as a result of regenerative braking, in order to charge the battery 52 with the resulting power.

The battery 52 functions as: a storage source for excess electric power; a storage source for regenerative energy during a regenerative braking operation; or an energy buffer provided for a load change resulting from acceleration or deceleration of a fuel cell vehicle. Suitable examples of the battery 52 may include a secondary cell, such as a nickel-cadmium battery, a nickel-hydrogen battery and a lithium battery. An SOC (State of Charge) sensor is attached to the battery 52 to detect the state of charge, being the remaining power, of the battery 52.

The traction inverter 53 may be, for example, a PWM inverter driven by pulse width modulation and the traction inverter 53 converts a direct-current voltage output from the fuel cell stack 20 or the battery 52 to a three-phase alternating current voltage in accordance with a control command provided by the controller 60 and controls a rotation torque of the traction motor 54. The traction motor 54 may be, for example, a three-phase alternating current motor which constitutes a power source of the fuel cell vehicle.

The auxiliary apparatuses 55 collectively refer to motors provided in respective parts of the fuel cell system 10 (e.g., power sources for the pumps), inverters for driving these motors, various types of in-vehicle auxiliary apparatuses (e.g., an air compressor, injector, cooling-water circulation pump, radiator, etc.).

The controller 60 is a computer system which includes a CPU, a ROM, a RAM, input/output interfaces and the like, wherein the controller 60 controls components of the fuel cell system 10. For example, when receiving a start signal IG output from an ignition switch, the controller 60 starts the operation of the fuel cell system 10 and obtains electric power required from the system as a whole based on an accelerator opening degree signal ACC output from an acceleration sensor and a vehicle speed signal VC output from a vehicle speed sensor. The electric power required from the system as a whole is the sum of the amount of electric power for the vehicle travel and the amount of electric power for the auxiliary apparatuses.

The electric power for the auxiliary apparatuses includes electric power consumed by the in-vehicle auxiliary apparatuses (the humidifier, air compressor, hydrogen pump, cooling-water circulation pump, etc.), electric power consumed by apparatuses which are required for the travel of the vehicle (a transmission, wheel control apparatus, steering gear, suspension, etc.), electric power consumed by apparatuses provided inside the passenger compartment (an air conditioner, lighting equipment, audio system, etc.), and the like.

The controller 60 determines the distribution ratio of the electrical power output from the fuel cell stack 20 and the electric power output from the battery 52 and controls the oxidant gas supply system 30 and the fuel gas supply system 40 so that the amount of electric power generated by the fuel cell stack 20 matches with a target electric power. The controller 60 further controls the DC/DC converter 51 so as to regulate the output voltage of the fuel cell stack 20 and thereby control the operating point (the output voltage and the output current) of the fuel cell stack 20.

In the fuel cell stack 20, a hydrogen ion generated in the anode 23 passes through the electrolyte membrane 22 and moves to the cathode 24 as expressed by Formula (1) above, and the hydrogen ion moved to the cathode 24 undergoes an electrochemical reaction with the oxygen in the oxidant gas supplied to the cathode 24, as expressed by Formula (2) above, so as to cause an oxygen reduction reaction. As a result, an oxide film will cover a surface of a platinum catalyst of a catalyst layer 24a and cause an effective area to be decreased, and power generation efficiency (output characteristics) will thereby be degraded.

In order to cope with such circumstances, the controller 60 performs refresh processing in which the controller 60 decreases the cell voltage to a reduction voltage (refresh voltage) at a predetermined timing and holds the reduction voltage for a predetermined time period (refresh time period) to thereby reduce the oxide film and remove it from the catalyst surface.

More specifically, by decreasing the voltage of each cell, i.e., the output voltage of the fuel cell stack 20, and holding the decreased voltage for a predetermined time period as shown at timings t1, t2 and t3 in FIG. 3, timings t11 and t12 in FIG. 6, and timing t21 in FIG. 8 (these drawings will be described later), the output current is increased to cause the electrochemical reaction in the catalyst layer 24a to transfer from an oxidation reaction zone to a reduction reaction zone in order to restore the catalytic activity.

The refresh processing inevitably has to be performed in order to suppress the degradation of the power generation efficiency of the fuel cell 20. However, such processing controls the output voltage of the fuel cell 20 by setting the output voltage to a voltage that is much lower than it should be, even though such situation is temporary. Accordingly, if the refresh processing is performed frequently, the oxidation and reduction of the platinum in the catalyst layer 24a will be repeated, leading to dissolution of the platinum.

The refresh processing should thus be performed only at suitable timings and at the minimum necessary frequency. In addition, the effect of the refresh processing has to be significant enough to restore the performance of the catalyst layer 24a to a necessary and sufficient level, even if the frequency of performing the refresh processing is low.

In order to fulfill both of these requirements, the present invention has focused on the amount of oxide film and the amount of performance degradation of the catalyst layer caused by the oxide film as the amounts that should be estimated in a highly accurate manner in order to determine the need for and content (e.g., a refresh voltage) of the refresh processing. More specifically, the present invention has focused on: the amount of type-II oxide film; the total amount of type-I oxide film and type-II oxide film; the amount of performance degradation caused by the type-II oxide film; and the total amount of performance degradation caused by the type-I oxide film and the performance degradation caused by the type-II oxide film.

<Example of Operation Control of the Fuel Cell System>

Figure 4:
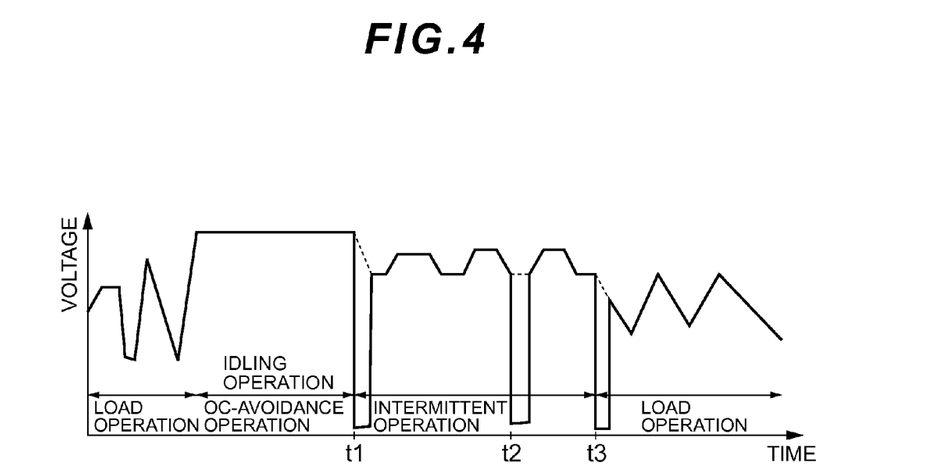
FIG. 4 is a timing chart showing an example of operation control of the fuel cell system.
Figure 5:
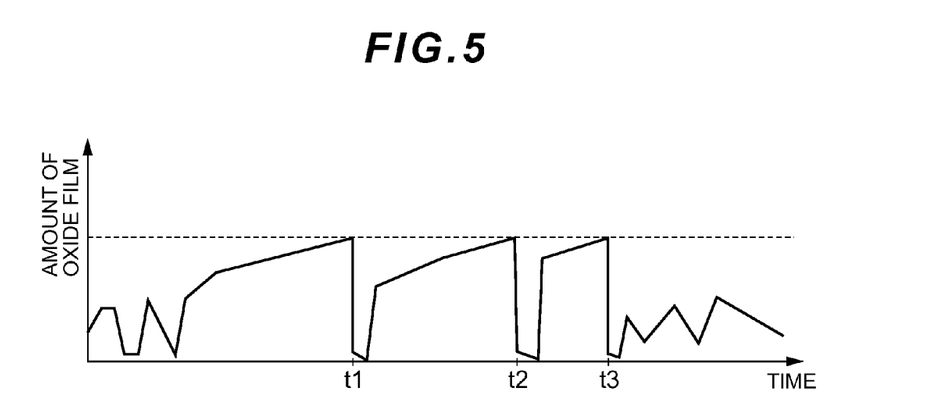
FIG. 5 is a timing chart showing that the amount of oxide film formed on a catalyst layer increases or decreases in accordance with a change in an output voltage of the fuel cell in FIG. 4.
Figure 6:
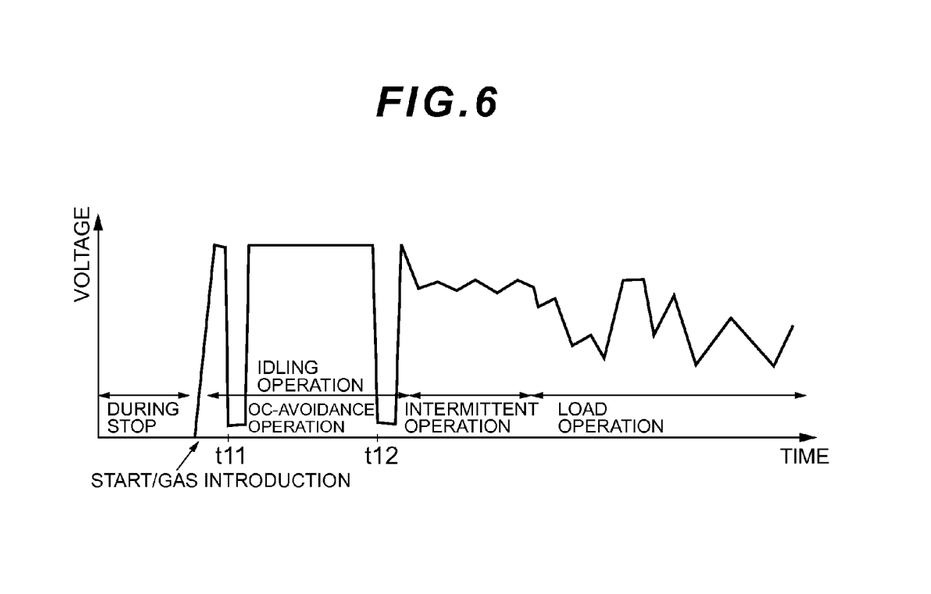
FIG. 6 is a timing chart showing another example of operation control of the fuel cell system.
Figure 7:
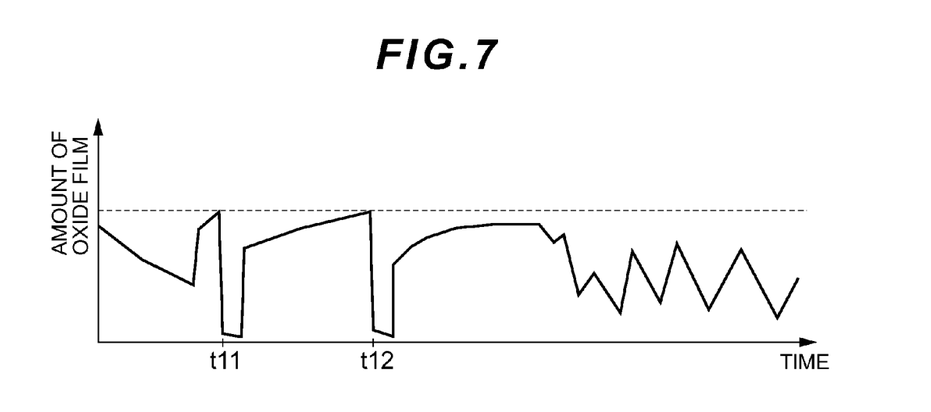
FIG. 7 is a timing chart showing that the amount of oxide film formed on a catalyst layer increases or decreases in accordance with a change in an output voltage of the fuel cell in FIG. 6.
Figure 8:
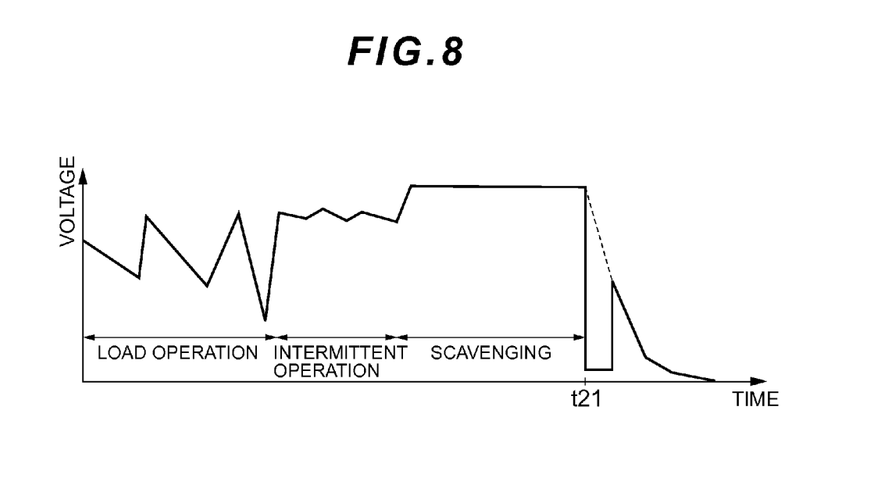
FIG. 8 is a timing chart showing further example of operation control of the fuel cell system.
Figure 9:
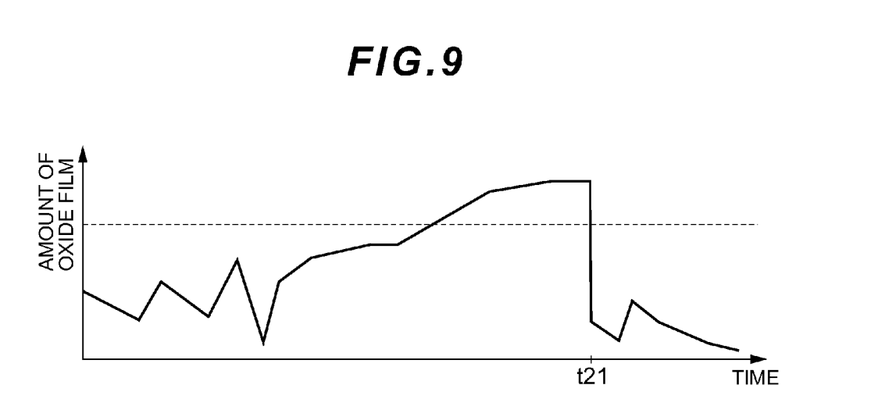
FIG. 9 is a timing chart showing that the amount of oxide film formed on a catalyst layer increases or decreases in accordance with a change in an output voltage of the fuel cell in FIG. 8.

FIGS. 4, 6 and 8 are timing charts each showing an example of operation control of the fuel cell system 10. FIGS. 5, 7 and 9 are timing charts indicating how the amount of oxide film formed on a surface of the catalyst layer 24a changes during the operation controls shown in FIGS. 4, 6 and 8, respectively.

As shown in FIGS. 4, 6 and 8, the fuel cell system 10 is configured so as to improve its power generation efficiency by switching the operation modes of the fuel cell stack 20 in accordance with the operation load.

For example, in a high load zone with a high power generation efficiency (an operation zone where the amount of power requested to be generated is equal to or higher than a predetermined value), the fuel cell system 10 performs a load operation in which the operation is controlled by calculating a power generation command value for the fuel cell stack 20 based on the opening degree of an accelerator and the vehicle speed, and the electric power required for travel of the vehicle and the electric power required for operation of the system are covered only by the electric power generated by the fuel cell stack 20 or by the electric power generated by the fuel cell stack 20 and the electric power supplied from the battery 52.

On the other hand, in a low load zone with a low power generation efficiency (an operation zone, satisfying the condition of performing an intermittent operation, where the amount of power requested to be generated is less than the predetermined value), the fuel cell system 10 performs an intermittent operation in which the operation is controlled by setting the power generation command value for the fuel cell stack 20 to zero, and the electric power required for travel of the vehicle and the electric power required for operation of the system are covered by the electric power supplied from the battery 52. It should be noted that the cell voltage is held relatively high during the intermittent operation. This is due to the fact that, if the cell voltage is low when a high load request (output increase request) is received during the intermittent operation, there will be a degradation in drivability.

When the vehicle is stopped, for example, immediately after the vehicle is started or while the vehicle is stopped at a red light, in other words, when the shift lever is in the P-range or N-range, or when the brake pedal is pressed and the vehicle speed is zero, even though the shift lever is in the D-range, the fuel cell system 10 performs an idling operation in which it operates the fuel cell stack 20 so as to generate electric power at a power generation voltage required for ensuring drivability while charging the battery 52 with the generated power.

Upon receipt of an operation stop signal IGOFF output by the ignition switch, the controller 60 performs a scavenging operation before stopping the operation. The scavenging operation refers to drying processing that is performed at the end of operation of the fuel cell 20 for the purpose of discharging the water trapped inside the fuel cell 20 and drying the fuel cell 20, and the scavenging operation is performed by supplying the oxidant gas to the fuel cell 20 in, for example, a state in which the supply of the fuel gas to the fuel cell 20 is stopped, and then discharging the water inside the fuel cell 20 toward the outside via the oxidant off-gas path 34.

Next, refresh processing that is performed when a predetermined refresh processing performing condition is satisfied during the operation of the fuel cell system 10 (e.g., timings t1, t2 and t3 in FIG. 4, timings t11 and t12 in FIG. 6 and timing at t21 in FIG. 8) will be described with reference to the flowchart shown in FIG. 3. In the following description, FIGS. 4-9 will also be referred to when necessary.

<Idling Operation>

For example, an idling operation may cause the fuel cell stack 20 to generate electric power at a constant voltage, as shown in FIG. 4. Since the power generation voltage during such operation is a voltage which may cause the formation of an oxide film on the platinum catalyst surface of the catalyst layer 24a, the amount of oxide film increases as time passes during the idling operation, as shown in FIG. 5.

<<Estimation of the Amount of Type-II Oxide Film>>

Figure 3:
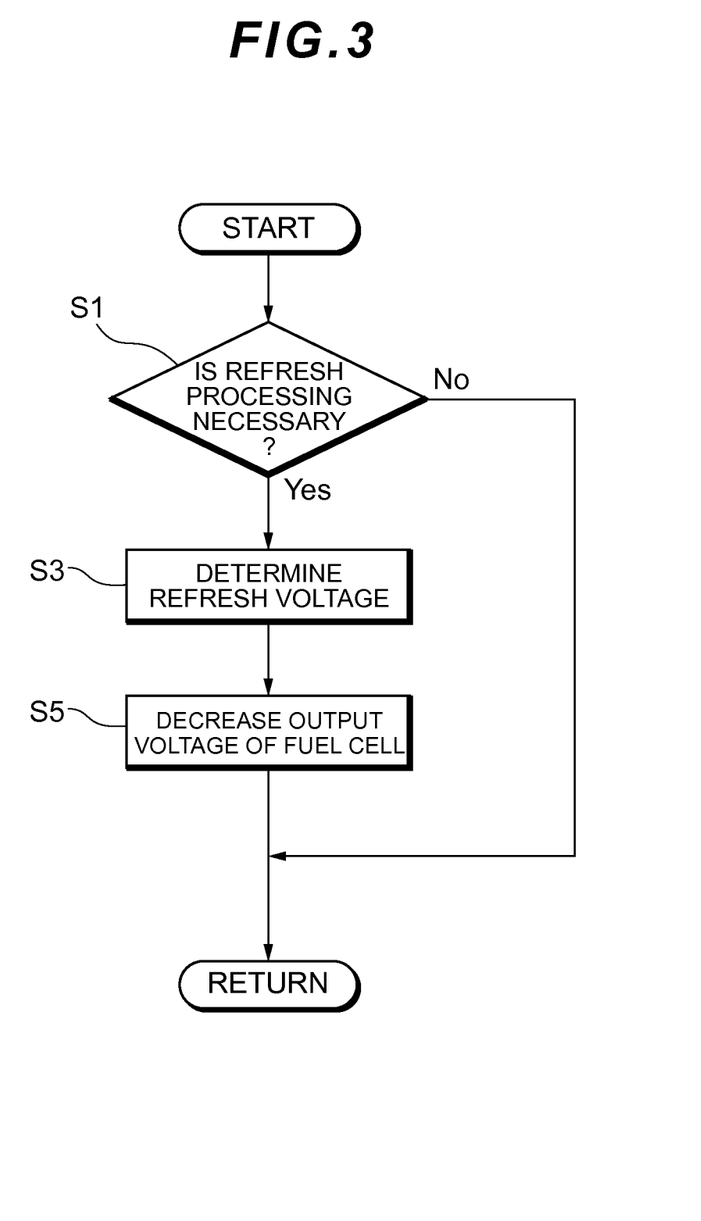
FIG. 3 is a flowchart showing a procedure for refresh processing during an operation of the fuel cell system.

During the idling operation, the controller 60 judges the need for the refresh processing at predetermined control intervals (step S1 in FIG. 3). In step S1, a judgment is made as to whether or not the amount of type-II oxide film in the oxide film formed on the platinum catalyst surface of the catalyst layer 24a is equal to or greater than a predetermined amount A.

Figure 10:
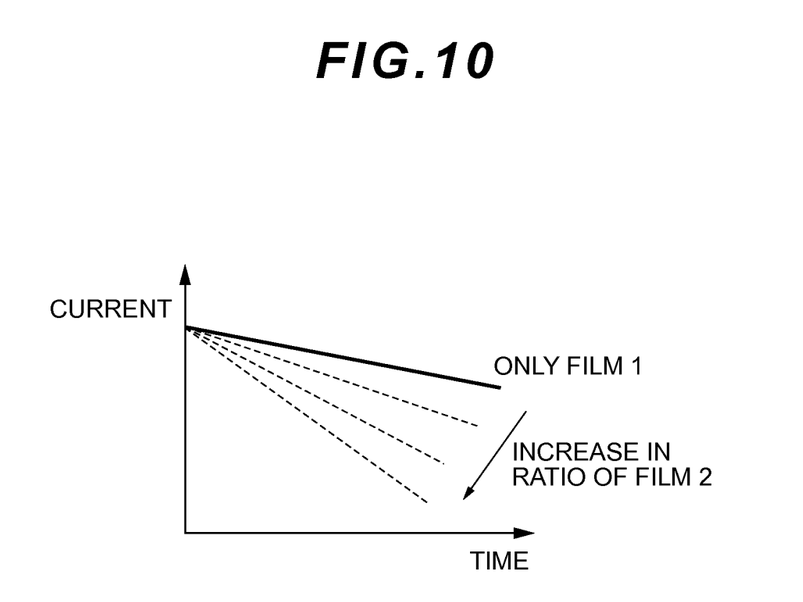
FIG. 10 is a diagram showing a relationship between an output current of the fuel cell stack and the content ratio of a type-II oxide film in an oxide film.

During such process, the controller 60 estimates the amount of type-II oxide film by, for example, referring to the map shown in FIG. 10. The map in FIG. 10 shows the relationship among the time elapsed from the previous refresh processing (horizontal axis), a power generation current of the fuel cell stack 20 (vertical axis) and the total amount of the oxide films and the breakdown thereof (solid line and broken line in FIG. 10). This map has been created based on the results of experiments and simulations and stored in a memory in the controller 60.

It can be understood from FIG. 10 that: the power generation current of the fuel cell stack 20 decreases as time passes from the previous refresh processing; and the decreasing rate of the power generation current of the fuel cell stack 20 relative to the elapsed time from the previous refreshing time, i.e., the influence on the degradation of the performance of the catalyst layer 24a, increases in accordance with the increase in the amount of type-II oxide film (denoted as "film 2" in FIG. 10) in the oxide film as a whole.

This further indicates that: an oxide film including the type-II oxide film would have a greater influence on the performance degradation of the catalyst layer 24a as compared to an oxide film consisting only of a type-I oxide film (denoted as "film 1" in FIG. 10); and if the oxide film includes the type-II oxide film, the higher the content ratio of the type-II oxide film, the greater its influence will be on the performance degradation of the catalyst layer 24a, i.e., the greater the amount of the performance degradation of the catalyst will become.

Figure 11:
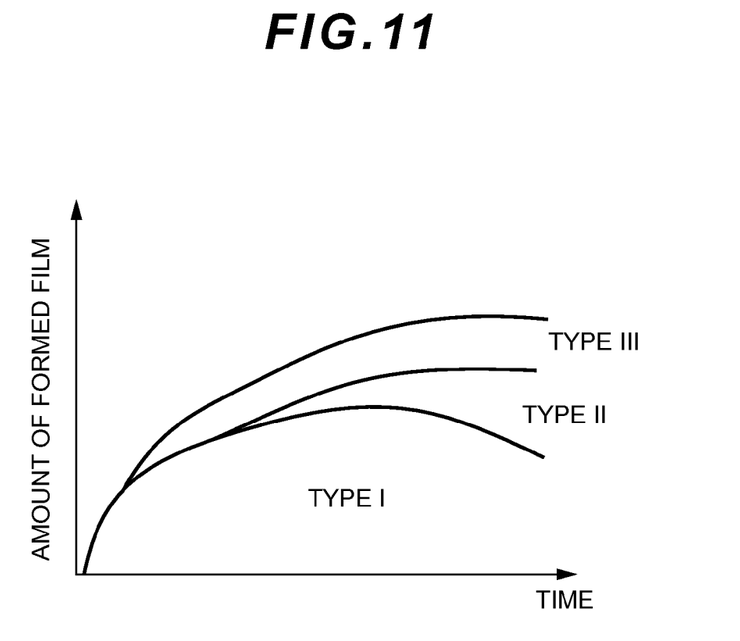
FIG. 11 is a diagram showing how the content ratios of a type-I oxide film, a type-II oxide film and a type-III oxide film in the oxide film formed on the catalyst layer each vary over time when an output voltage of the fuel cell stack is held at a constant value.

The type-I oxide film, type-II oxide film and type-III oxide film may be present in a mixed state in a single oxide film. If the output voltage of the fuel cell stack 20 is held at a constant oxide film formation voltage (oxidation voltage), the content ratios of the type-I oxide film, type-II oxide film and type-III oxide film in the oxide film gradually vary as the holding time passes, as shown in FIG. 11, and the magnitudes of the reduction voltages of the respective oxide films satisfy the following relationship:

Type-I oxide film (e.g., 0.65-0.9 V)>Type-II oxide film (e.g., 0.4-0.6 V)>Type-III oxide film (e.g., 0.05-0.4 V).

Figure 12:
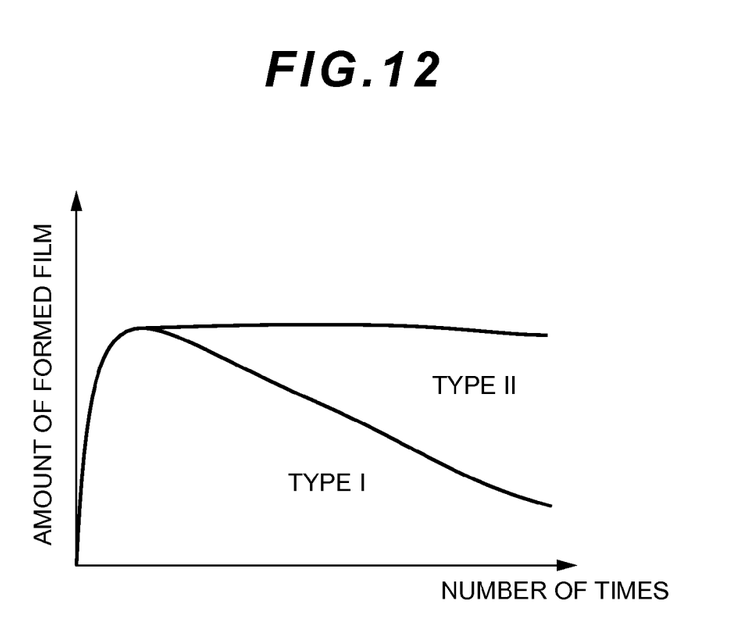
FIG. 12 is a diagram showing how the content ratios of the type-I oxide film and type-II oxide film in the oxide film formed on the catalyst layer each vary in accordance with an increase in the number of times the output voltage of the fuel cell stack crosses a predetermined boundary voltage during its increase and decrease.

In addition, the respective content ratios of the type-I oxide film, type-II oxide film and type-III oxide film in the oxide film as a whole gradually vary in accordance with the increase in the number of times the output voltage of the fuel cell stack 20 crosses a boundary voltage (e.g., 0.8 V) during its increase and decrease (hereinafter referred to as the "number of cycles"), as shown in FIG. 12 (the type-III oxide film is not shown therein).

As described above, since there may be two or more stages of reduction voltage that are capable of removing the oxide film, if the refresh voltage during the refresh processing is only decreased to a first reduction voltage that is capable of only removing the type-I oxide film, the type-II oxide film and type-III oxide film might be left without being successfully removed, and the performance of the catalyst layer 24a may therefore not be restored sufficiently.

In order to cope with such issue, in the present embodiment, by estimating the amount of type-II oxide film in the catalyst layer 24a using the map shown in FIG. 10 and, based on the estimation result, judging the need for refresh processing (step S1) and setting the refresh voltage (step S3), it becomes possible to suppress the degradation of the catalyst layer 24 caused by the refresh processing, while still obtaining the effect of the refresh processing.

If the judgment result in step S1 is "No," i.e., if the amount of type-II oxide film formed on the platinum catalyst surface of the catalyst layer 24a is equal to or smaller than the predetermined amount A, being a predetermined threshold value, the controller 60 skips the processes in steps S3 and S5.

As described above, according to the present embodiment, the refresh processing will not be performed when the oxide film only consists of the type-I oxide film or when the amount of type-II oxide film is equal to or smaller than the predetermined amount A, even if some type-II oxide film has been formed. Accordingly, it is possible to suppress the degradation of the catalyst layer 24a that would otherwise be caused by frequently-performed refresh processing.

On the other hand, if the judgment result in step S1 is "Yes," i.e., if the amount of type-II oxide film formed on the platinum catalyst surface of the catalyst layer 24a exceeds the predetermined amount A, the controller 60 sets the refresh voltage to a Second reduction voltage that is capable of removing the type-II oxide film (step S3) and then performs the refresh processing with the output voltage of the fuel cell stack 20 being decreased to the set voltage for a predetermined refresh time period (step S5).

As described above, according to the present embodiment, since the refresh processing will not be performed when the amount of type-II oxide film that has been formed is equal to or smaller than the predetermined amount A, the degradation of the catalyst layer 24a that would be caused by frequently-performed refresh processing can be suppressed as compared to a configuration in which the need for the refresh processing is judged by focusing only on the typed oxide film and the amount thereof that has been formed.

In the present embodiment, since the type-II oxide film, that has a greater influence on the performance degradation of the catalyst layer 24a than the type-I oxide film, can be removed more reliably, a necessary and sufficient level of refresh effect can be obtained, even though the frequency of refresh processing decreases as compared to the configuration in which the need for the refresh processing is judged by focusing only on the type-I oxide film and the amount thereof that has been formed.

It should be noted that, since the second reduction voltage varies depending on the environment in which the catalyst layer 24 is placed, it is preferable for the refresh voltage that is set in step S3 to be changeable according to the ambient environment (e.g., relative humidity, temperature, etc.) surrounding the catalyst layer 24a and the fuel cell stack 20.

Although the above embodiment has described an example in which the controller 60 judges whether or not the amount of type-II oxide film formed on the platinum catalyst surface of the catalyst layer 24a exceeds the predetermined amount A in step S1 in FIG. 3, the content of the judgment in step S1 is not limited to such example. Other examples will be described below.

<<Estimation of the Total Amount of Type-I Oxide Film and Type-II Oxide Film>>

For example, the controller 60 may judge whether or not the total amount of type-I oxide film and type-II oxide film exceeds a predetermined amount B, being a predetermined threshold value (where the predetermined amount A<the predetermined amount B), by referring to, for example, the maps shown in FIGS. 11 and 12 in step S1 in FIG. 3, and perform refresh processing in steps S3 and S5 when the judgment result is "Yes."

In this example, it is determined, not only when the amount of type-II oxide film exceeds the predetermined amount A but also when the total amount of type-I oxide film and type-II oxide film exceeds the predetermined amount B, even though the amount of type-II oxide film is equal to or smaller than the predetermined amount A, that the performance of the catalyst layer 24a that has been degraded by the oxide films needs to be restored, and thus the refresh processing is performed.

In such case as well, it is possible to obtain the effect of the refresh processing while suppressing the frequency of the refresh processing. In addition, as compared to the case in which the judgment is made only based on the predetermined amount A, the judgment accuracy as to the need for refresh processing can be further improved.

In another example, the judgment as to whether the total amount of type-I oxide film and type-II oxide film exceeds the predetermined amount B may be configured so as to be performed only when the judgment result in step S1 in FIG. 3 is "No," and if the judgment result of the total amount is "Yes," the refresh processing in steps S3 and S5 in FIG. 3 will be performed, while if the judgment result of the total amount is "No," steps S3 and S5 in FIG. 3 will be skipped.

<<Estimation of the Amount of Performance Degradation Caused by Type-II Oxide Film>>

Alternatively, the controller 60 may judge, in step S1 in FIG. 3, whether or not the amount of performance degradation of the catalyst layer 24a caused by the type-II oxide film exceeds a predetermined amount C, being a predetermined threshold value, by, for example, referring to the map in FIG. 10 and perform refresh processing in steps S3 and S5 in FIG. 3 when the judgment result is "Yes."

In such case as well, it is possible to obtain the effect of the refresh processing while suppressing the frequency of the refresh processing.

<<Estimation of the Amount of Performance Degradation Caused by Type-I Oxide Film and Type-II Oxide Film>>

Alternatively, the controller 60 may judge, in step S1 in FIG. 3, whether or not the total of the amount of performance degradation of the catalyst layer 24a caused by the type-I oxide film and the amount of performance degradation of the catalyst layer 24a caused by the type-II oxide film exceeds a predetermined amount D, being a predetermined threshold value (where the predetermined amount C<the predetermined amount D), by, for example, referring to the map in FIG. 10, and performing the refresh processing in steps S3 and S5 in FIG. 3 when the judgment result is "Yes."

In this example, it is determined, not only when the amount of performance degradation of the catalyst layer 24a caused by the type-II oxide film exceeds the predetermined amount C, but also when the total amount of performance degradation caused by the type-I oxide film and type-II oxide film exceeds the predetermined amount D, even though the amount of performance degradation caused by the type-II oxide film is equal to or smaller than the predetermined amount C, that the performance of the catalyst layer 24a that has been degraded by the oxide films needs to be restored, and thus the refresh processing is performed.

In such case as well, it is possible to obtain the effect of the refresh processing while suppressing the frequency of the refresh processing. In addition, as compared to the case in which the judgment is made only using the predetermined amount C, the judgment accuracy as to the need for refresh processing can be further improved.

In another example, the total amount judgment as to whether or not the total amount of performance degradation caused by the typed oxide film and type-II oxide film exceeds the predetermined amount D may be configured so as to be performed only when the judgment result in step S1 in FIG. 3 is "No," and if the result of such total amount judgment is "Yes," the refresh processing in steps S3 and S5 in FIG. 3 will be performed, while if the result of such total amount judgment is "No," steps S3 and S5 in FIG. 3 will be skipped.

<Other Operation Statuses>

Although the above embodiment has described an example in which the need for refresh processing is judged while the operation status of the fuel cell system 10 is in an idling operation, the timing for judging the need for refresh processing is not limited to such operation status. The following description will describe some examples of other operation statuses.

<<Intermittent Operation>>

An intermittent operation is an operation for causing the fuel cell stack 20 to generate electric power at a constant voltage, as shown in FIG. 4, and the power generation voltage during such operation is a voltage that allows an oxide film to be formed on the platinum catalyst surface of the catalyst layer 24a. Accordingly, during the intermittent operation, the amount of oxide film increases as time passes, as shown in FIG. 5.

During the intermittent operation, the controller 60 also makes a judgment as to the need for the refresh processing that is similar to S1 in FIG. 3 and performs the refresh processing in steps S3 and S5 in FIG. 3 when the judgment result is "Yes," i.e., when the refresh processing is necessary.

It should be noted that during the judgment as to the need for refresh processing, judgments may be made based on: the amount of the type-II oxide film; the total amount of the type-I oxide film and type-II oxide film; the amount of performance degradation caused by the type-II oxide film; or the total amount of performance degradation caused by the type-I oxide film and the type-II oxide film, in the same way as the judgment made during the idling operation described above.

<<Scavenging Operation>>

A scavenging operation is also an operation for causing the fuel cell stack 20 to generate electric power at a constant voltage, as shown in FIG. 8, and the power generation voltage during such operation is a voltage that allows an oxide film to be formed on the platinum catalyst surface of the catalyst layer 24a. Accordingly, the amount of oxide film also increases as time passes during the scavenging operation, as shown in FIG. 9.

However, the controller 60 does not make a judgment as to the need for refresh processing that is similar to step S1 in FIG. 3 during the scavenging operation but rather continues the scavenging operation until the termination of the scavenging operation. At the end of such scavenging operation, the controller 60 makes a judgment as to the need for refresh processing that is similar to step S1 in FIG. 3 and performs the refresh processing in steps S3 and S5 in FIG. 3 when the judgment result is "Yes," i.e., when the refresh processing is necessary.

It should be noted that, during the judgment as to the need for refresh processing, judgments may be made based on: the amount of the type-II oxide film; the total amount of the type-I oxide film and type-II oxide film; the amount of performance degradation caused by the type-II oxide film; or the total amount of performance degradation caused by the type-I oxide film and the type-II oxide film, in the same way as the judgments made during the idling operation and the intermittent operation.

The following examples of estimation means may be employed as methods for estimating the amount of oxide film (the amount of the type-II oxide film or the total amount of the type-I oxide film and type-II oxide film):

(1) The amount of oxide film is estimated based on the change over time in an output current while the fuel cell 20 is being operated at a constant voltage (corresponding to the tilts of the linear line and the broken line in FIG. 1). In this case, a map indicating the relationship between the change over time in the output current (tilt) and the amount of oxide film, for each voltage which is set as a constant value during the constant voltage operation, may be prepared in, for example, the controller 60.

Figure 13:
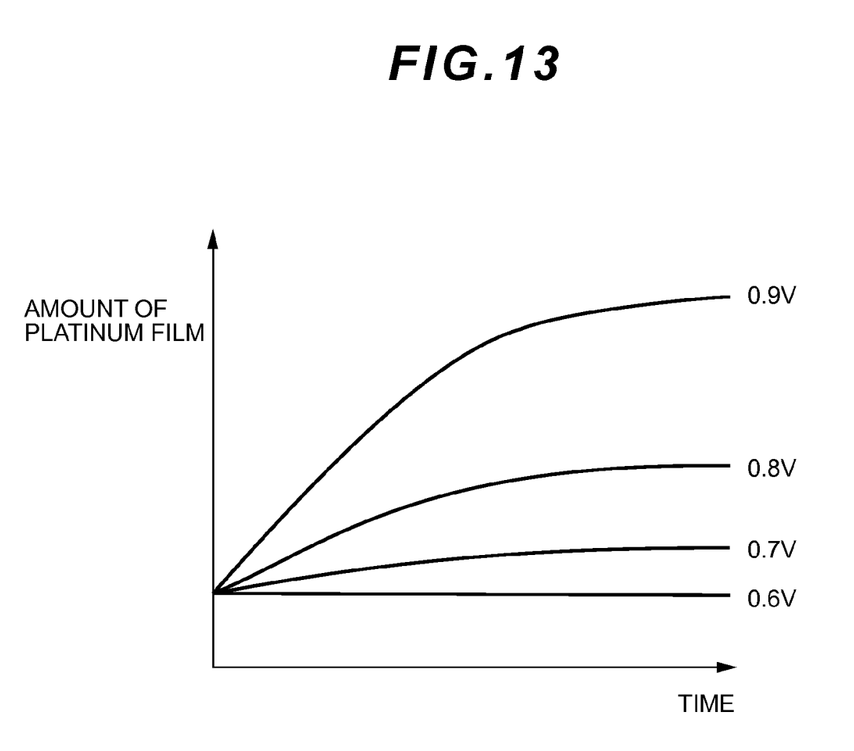
FIG. 13 is a diagram showing that the amount of oxide film formed on the catalyst layer varies over time when the output voltage of the fuel cell stack is held at a constant value and indicating that the higher the held voltage, the greater the amount of oxide film that will be formed.

(2) The amount of oxide film is estimated based on a duration for which the fuel cell 20 is operated at a constant voltage (see FIG. 13). In this case, a map as shown in FIG. 13 may be prepared in, for example, the controller 60, for each voltage which is set as a constant value during the constant voltage operation (in FIG. 13, 0.6 V, 0.7 V, 0.8 V and 0.9 V are shown as examples).

(3) The amount of oxide film is estimated by counting, by the controller 60, the number of times that the output voltage of the fuel cell 20 crosses a predetermined boundary voltage (the number of cycles) during its increase and decrease and then the estimate is made based on such number of times (see FIG. 9).

Figure 14:
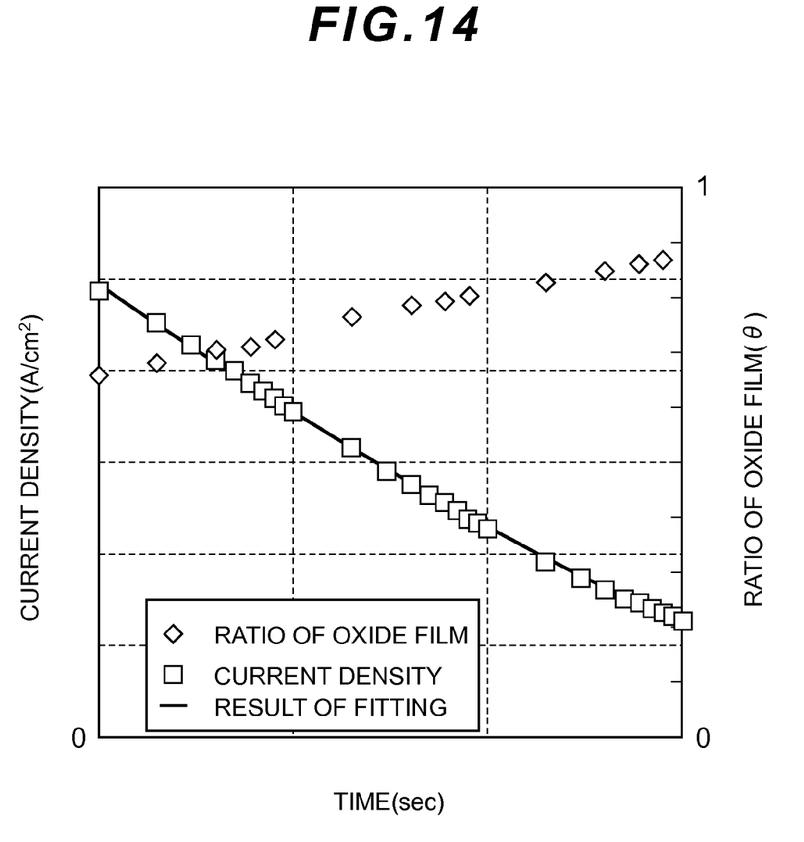
FIG. 14 is a diagram showing an example of a relationship between an output current (current density) and an oxide film ratio (amount of oxide film) when the output voltage of the fuel cell stack is held at a constant value.

(4) The amount of oxide film is estimated based on: a theoretical equation obtained by adding the concept of the oxide film ratio to the Butler-Vollmer equation (see Equation 1) with the experimental results as shown in, for example, FIG. 14 being fitted thereinto; and the output current (current density) of the fuel cell 20. It should be noted that, although the constant n in a case in which the oxide film only consists of the type-I oxide film is $n \approx 1$, the constant n becomes $n>1$ as the ratio of the type-II oxide film increases and the constant n becomes larger in accordance with the increase in such ratio.

$$i = i_0(1 - n\theta)^m \exp\left(-\frac{\beta F}{RT}\eta\right)$$ [Equation 1]

i: current density
$i_0$: exchange current density
n: constant (fitted)
θ: oxide film ratio
m: constant (fitted)
β: constant (fixed)
F: Faraday constant
η: overvoltage
R: gas constant
T: Temperature In each of the above embodiments, there may be additional steps of checking the effect of the refresh processing after the process in step S5 and performing refresh processing with a refresh voltage that is set lower than the voltage set in step S3 as an additional process that is performed when the effect of the refresh processing is insufficient.

Specifically, the control apparatus according to the present invention may be configured so as to estimate the amount of performance restoration of the catalyst layer after performing performance restoration processing, and to perform, when the estimated amount of performance restoration is equal to or smaller than a predetermined amount E, being a predetermined threshold value (where the predetermined amount E<the predetermined amount C), another performance restoration processing with a set voltage being set lower than a previously set voltage.

With such configuration, it becomes possible to avoid a situation in which the performance restoration is left at an insufficient level after the performance restoration processing has been performed. In addition, even if the oxide film contains a third oxide film (type-III oxide film) that can be removed only by decreasing the output voltage of the fuel cell to a third oxide film removal voltage that is lower than the second oxide film removal voltage.

In addition, although applications in which the fuel cell system 10 is used as an in-vehicle power system are described in each of the above-described embodiments, the applications of the fuel cell system 10 are not limited thereto. For example, the fuel cell system 10 may be installed as a power source for a movable body (e.g., a robot, a ship, an airplane, etc.) other than a fuel cell vehicle. In addition, the fuel cell system 10 according to the above embodiments may be used as a power generating facility for houses, buildings, etc. (stationary power generating systems).

What is claimed is:

1. A fuel cell system comprising:
a fuel cell including a membrane-electrode assembly in which electrodes, each having a catalyst layer, are arranged on both surfaces of a polymer electrolyte membrane; and
a control apparatus which performs performance restoration processing for the catalyst layer by decreasing an output voltage of the fuel cell to a predetermined voltage,
wherein, when an oxide film formed on the catalyst layer during power generation of the fuel cell contains, in addition to a first oxide film that can be removed by decreasing the output voltage of the fuel cell to a first oxide film removal voltage, a second oxide film that can be removed by decreasing the output voltage of the fuel cell to a second oxide film removal voltage which is lower than the first oxide film removal voltage, the control apparatus estimates at least one of: an amount of second oxide film and an amount of performance degradation of the catalyst layer caused by the second oxide film and performs the performance restoration processing only when the estimated amount satisfies a predetermined condition, wherein the control apparatus performs the performance restoration processing by setting the predetermined voltage so as to be equal to or lower than the second oxide film removal voltage.

2. The fuel cell system according to claim 1, wherein, when the control apparatus determines that the amount of second oxide film exceeds a predetermined amount A, the control apparatus performs the performance restoration processing in which the predetermined voltage is set so as to be equal to or lower than the second oxide film removal voltage.

3. The fuel cell system according to claim 1, wherein, when the control apparatus determines that the amount of performance degradation of the catalyst layer caused by the second oxide film exceeds a predetermined amount C, the control apparatus performs the performance restoration processing in which the predetermined voltage is set so as to be equal to or lower than the second oxide film removal voltage.

4. A fuel cell system comprising:
a fuel cell including a membrane-electrode assembly in which electrodes, each having a catalyst layer, are arranged on both surfaces of a polymer electrolyte membrane; and
a control apparatus which performs performance restoration processing for the catalyst layer by decreasing an output voltage of the fuel cell to a predetermined voltage,
wherein, when an oxide film formed on the catalyst layer during power generation of the fuel cell contains, in addition to a first oxide film that can be removed by decreasing the output voltage of the fuel cell to a first oxide film removal voltage, a second oxide film that can be removed by decreasing the output voltage of the fuel cell to a second oxide film removal voltage which is lower than the first oxide film removal voltage, the control apparatus performs the performance restoration processing in which the predetermined voltage is set so as to be equal to or lower than the second oxide film removal voltage when an estimated amount of the second oxide film or an estimated amount of performance degradation of the catalyst layer caused by the second oxide film satisfies a condition that is based on a predetermined threshold value.

* * * * *